United States Patent [19]

Perrey et al.

[11] 4,250,071

[45] Feb. 10, 1981

[54] MIXTURE OF AMMONIA AND ALKOXYLATED POLY-SILOXANES AND ITS USE AS A HEAT SENSITIZER

[75] Inventors: Hermann Perrey, Krefeld; Martin Matner, Odenthal, both of Fed. Rep. of Germany

[73] Assignee: Bayer Aktiengesellschaft, Leverkusen, Fed. Rep. of Germany

[21] Appl. No.: 969,100

[22] Filed: Dec. 13, 1978

[30] Foreign Application Priority Data

Dec. 20, 1977 [DE] Fed. Rep. of Germany ....... 2756774

[51] Int. Cl.³ .............................................. C08K 5/54
[52] U.S. Cl. ......................................... 260/29.7 NR
[58] Field of Search ................. 260/29.7 NR, 29.2 M; 528/28, 29

[56] References Cited

U.S. PATENT DOCUMENTS

| | | | |
|---|---|---|---|
| 3,246,339 | 4/1966 | Sinn | 260/29.7 NR |
| 3,255,140 | 6/1966 | Sinn | 525/104 |
| 3,255,141 | 6/1966 | Damm | 525/104 |
| 3,306,869 | 2/1967 | Lahr | 528/29 |
| 3,341,338 | 9/1967 | Pater | 528/29 |
| 3,484,394 | 12/1969 | Holdstock | 260/29.7 R |
| 3,506,605 | 4/1970 | Hornig | 525/1 |
| 3,629,310 | 12/1971 | Bailey | 528/29 |
| 3,702,315 | 11/1972 | Knechtges | 260/29.6 MN |
| 3,876,577 | 4/1975 | Hornig | 260/29.7 T |
| 3,969,289 | 7/1976 | Coffin | 260/23.7 A |

*Primary Examiner*—Paul R. Michl
*Attorney, Agent, or Firm*—Connolly and Hutz

[57] ABSTRACT

Mixtures of ammonia and alkoxylated polysiloxanes may be used as heat sensitizer for rubber latices. The latices thus obtained are stable so that no coagulation occurs even in the event of prolonged storage or under mechanical stressing.

6 Claims, No Drawings

MIXTURE OF AMMONIA AND ALKOXYLATED POLY-SILOXANES AND ITS USE AS A HEAT SENSITIZER

Heat-sensitised latex mixtures are known. They are produced from heat-sensitisable polymer latices, and these latices may be obtained by emulsion polymerisation. Their heat sensitisation and agents suitable for the purpose are described for example in German Pat. Nos. 1,268,828 and 1,494,037 and in U.S. Pat. No. 3,484,394.

A process for the production of heat-sensitisable synthetic rubber latices is described in German Pat. No. 1,243,394. Heat-sensitised latex mixtures may be used for impregnating non-woven materials and for the production of hollow articles (for example gloves) by the dip process.

Alkoxylated polysiloxanes are described as heat sensitisers in the above-mentioned literature references. However, the heat-sensitised latex mixtures produced with these heat sensitisers are not sufficiently stable during processing. Thus, the mixtures are generally not stable in storage, the preset coagulation temperature decreases with time, and local thickening or spot formation occurs in the actual storage vessels before processing, even in the absence of any external effects. In many cases, the lack of stability is even more noticeable during processing itself, resulting in the formation of undesirable deposits on stirrers, pumps, guide rollers or between squeezing rollers to the considerable detriment of further processing.

For improving mechanical stability, non-ionic emulsifiers are added to the latex mixtures which are heat-sensitised with the alkoxylated polysiloxanes. In order to obtain adequate stability levels, however, considerable quantities have to be added.

In most cases, this adversely affects heat sensitisability, in other words, relatively large quantities of heat sensitisers are required for adjusting a predetermined coagulation temperature.

In order to increase stability, ammonia is also occasionally added to the latices which are heat-sensitised with the known alkoxylated polysiloxanes. However, even this does not eliminate the need to add non-ionic emulsifiers as stabilisers.

It has now surprisingly been found that certain alkoxylated polysiloxanes used as heat sensitisers in combination with ammonia give extremely stable heat-sensitive latex mixtures, even without the addition of emulsifiers.

Accordingly, the present invention relates to a mixture of ammonia and alkoxylated polysiloxanes corresponding to the formula

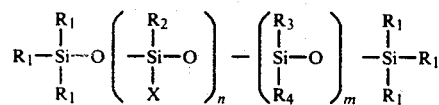

in which this formula represents the gross composition of a linear, statistically distributed copolymer of

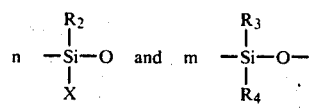

units with terminal

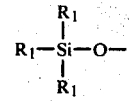

groups
and in which
$R_1$, $R_2$ and $R_3$ are the same or different and each is a $C_1$–$C_{10}$-alkyl or aryl radical optionally substituted by halogen atoms (e.g. chlorine or bromine),
$R_4$ represents hydrogen or a $C_1$–$C_{10}$-alkyl or aryl radical optionally substituted by halogen (eg. chlorine or bromine),
n is a number from 1 to 50,
m is a number from 0 to 50 and
X represents the radical $$-(CH_2)_p-(Y)_q-(O-CHR_5-CHR_6)_x-(O-CHR_7-CHR_8)_y-OR_9 \quad (Ia)$$

the units ($O$—$CHR_5$—$CHR_6$) and ($O$—$CHR_7$—$CHR_8$) being present in blocks, in statistical distribution or partly in blocks and partly in statistical distribution in the radical X, and in which
p is a number from 1 to 8 and
q is 0 or the number 1,
Y represents

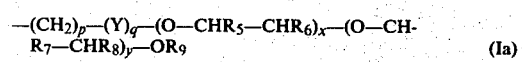

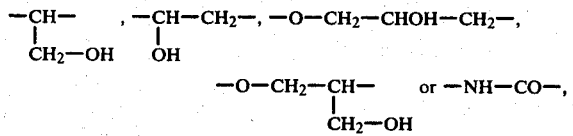

$R_5$, $R_6$, $R_7$ and $R_8$ are the same or different and each represents hydrogen, $C_1$–$C_4$-alkyl, chloromethyl or phenyl,
$R_9$ represents an alkyl, aryl, aralkyl or alkaryl radical containing from 1 to 18 carbon atoms and
x and y are numbers from 5 to 100.

Preferred radicals $R_1$ to $R_3$ are alkyl and aryl radicals containing from 1 to 8 carbon atoms, such as for example the methyl, ethyl, propyl or butyl radical and the phenyl, tolyl or xylyl radical which may optionally be mono-substituted with halogens such as, for example, chlorine and bromine.

In formulae (I) and (Ia) above:
$R_1$, $R_2$ and $R_3$ preferably represent the phenyl and methyl group and, with particular preference, the methyl group,
$R_4$ preferably represents hydrogen and the methyl group and, with particular preference, the methyl group,
n is preferably a number from 3 to 20 and, with particular preference, a number from 4 to 10,
m is preferably a number from 0 to 20 and, with particular preference, a number from 0 to 10,
Y preferably represents

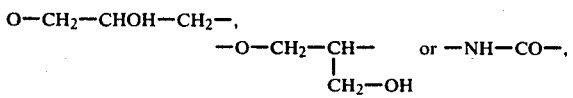

p preferably represents the numbers 1 and 3 and, with particular preference, the number 3, q preferably represents the numbers 0 and 1 and, with particular preference, the number 1, $R_5$, $R_6$ and $R_7$ preferably represent hydrogen, $R_8$ preferably represents the methyl radical, $R_9$ preferably represents an alkyl radical containing from 1 to 6 carbon atoms, x is preferably a number from 10 to 50 and, with particular preference, a number from 15 to 35 and y is preferably a number from 8 to 40 and, with particular preference, a number from 12 to 25.

The alkoxylated polysiloxane may be produced as follows:

For example, epoxides containing a C=C double bond, such as allyl glycidyl ether or butadiene monoepoxide, may be reacted with SiH-group containing polysiloxanes in the presence of a platinum catalyst to form polyepoxy polysiloxanes which lead to the alkoxylated polysiloxanes according to the invention by acid-catalysed reaction of the epoxy groups with polyalkylene glycol monoethers. It is also possible to convert polyalkylene glycol monoethers into saturated polyalkylene glycol ethers by reaction with alkenyl halides, such as for example allyl chloride, or into the unsaturated urethanes by reaction with unsaturated isocyanates, such as for example allyl isocyanate, in order subsequently to add these unsaturated derivatives with SiH-group-containing polysiloxanes in the presence of a platinum catalyst. Another method of producing the heat sensitisers according to the invention is to react polyalkylene glycol monoethers with polysiloxanes containing Si—$CH_2$—Cl groups.

The polyalkylene glycol monoethers used for producing the alkoxylated polysiloxanes are preferably obtained by polyalkoxylating lower alcohols, such as for example methanol, ethanol, propanol, butanol, pentanol or hexanol, with ethylene and propylen oxide. In this way it is possible to produce block polymers or polymers in which the oxyalkyl groups are statistically distributed, so-called copolymers, or even mixed forms of these two types. Copolymers are preferred and particular preference is given to products of the type in which the alcohols are initially reacted with a mixture of propylene oxide and 80 to 90% of the total quantity of ethylene oxide to form copolymers, followed by introduction of the remaining 10 to 20% of ethylene oxide so that the terminal groups of these polyalkylene glycol monoethers are almost all primary OH-groups. Preferred polyalkylene glycol monoethers contain from 40 to 60% by weight of ethylene oxide, particularly preferred polyalkylene glycol monoethers being synthesised from equal quantities by weight of ethylene and propylene oxide. Furthermore, it is preferred to use polyalkylene glycol monoethers having molecular weights of from 1000 to 5000, most preferably those having molecular weights of from 1500 to 3000.

In the reaction of the polyepoxy siloxanes with the polyalkylene glycol monoethers to form the polyalkylene glycol polysiloxanes, the hydroxy compounds are reacted with the epoxy groups preferably in a 10 to 100% molar excess and, with particular preference, in a 10 to 50% molar excess. Although smaller excesses and stoichiometric or even sub-stoichiometric reaction ratios of hydroxy to epoxy groups are possible, they frequently lead to insoluble, crosslinked products.

Even where the alkoxylated polysiloxanes are produced by reacting unsaturated polyalkylene glycol ethers with polysiloxanes containing Si-H-groups or by reacting polyalkylene glycol monoethers with polysiloxanes containing Si—$CH_2$—Cl-groups, it is advisable to use the unsaturated polyalkylene glycol ethers and the polyalkylene glcyol monoethers in excess.

In general, the products are soluble in water, although water-soluble products may also be used in accordance with the invention. Since the effectiveness of the polyalkylene glycol polysiloxanes increases with favourable distribution of the products, it is advisable in the case of water-insoluble substances to add conventional emulsifiers such as, for example, alkylaryl sulphonates, aryl sulphonates, or fatty acid salts, to the products in order to improve their emulsifiability. Additions of from 1 to 10%, based on the polyalkylene glycol polysiloxanes, are generally sufficient. Larger quantities should be avoided because anion-active emulsifiers as such can adversely affect the stability of the latex mixtures.

The mixture of ammonia and alkoxylated polysiloxanes according to the invention may be used as a heat sensitiser for rubber latices.

For producing the heat-sensitisable stable latices themselves, standard olefinically unsaturated monomers may be polymerised in aqueous emulsion. Examples of the production of latices of the type in question may be found in German Pat. No. 1,423,394 and in German Offenlegungsschrifts Nos. 2,232,526 and 2,005,974. Suitable monomers are any radically polymerisable olefinically unsaturated compounds, such as for example ethylene, butadiene, isoprene, acrylonitrile, styrene, divinyl benzene, α-methyl styrene, methacrylonitrile, acrylic acid, methacrylic acid, 2-chloro-1,3-butadiene, esters of acrylic acid and methacrylic acid with $C_1$-$C_8$-alcohols or polyols, acrylamide, methacrylamide, N-methylol (meth)acrylamide, (meth)acrylamido-N-methylol methyl ether, itaconic acid, maleic acid, fumaric acid, diesters and semiesters of unsaturated dicarboxylic acids, vinyl chloride, vinylacetate and vinylidene chloride, which may be used either individually or in combination.

The polymerisation reaction is carried out in the presence of emulsifiers, for which purpose the usual non-ionic or anionic emulsifiers may be used either on their own or in combination. The emulsifier is used in a total quantity of from about 0.1 to 10% by weight, based on the monomers.

The emulsion polymerisation reaction may be initiated by radical formers, preferably organic peroxide compounds, which are used in quantities of from 0.01 to 2% by weight, based on monomer. Depending upon the monomer combination used, small quantities of regulators, for example mercaptans and halogenated hydrocarbons, may be used for reducing the molecular weight of the polymer. The emulsion polymerisation reaction may be carried out in two ways. Firstly, the total quantity of monomers and most of the aqueous phase containing the emulsifiers may be initially introduced, the polymerisation reaction started by adding the initiator, and the rest of the aqueous phase added either continuously or in batches during the polymerisation reaction. Secondly, it is also possible to use the so-called "monomer feed" technique in which only part of the monomers and the aqueous phase containing the emulsifier are initially added, the rest of the monomers and the aqueous phase being added either continuously or in batches, according to the conversion, after the polymerisation reaction has been started. The subsequently added monomer fraction may be pre-emulsified in the aqueous phase. Both processes are known.

Additives may be introduced into the heat-sensitisable latices either before or during processing. Thus, acid-separating agents, which are added in addition to the sensitiser, promote coagulability by reducing the coagulation temperature. Other additives are, for example, dyes, pigments, fillers, thickeners, electrolytes, antiagars, water-soluble resins and vulcanisation chemicals.

After they have been produced, the heat-sensitisable latices are heat-sensitised by adding the alkoxylated polysiloxanes in quantities of from 0.05 to 10% by weight, preferably in quantities of from 0.05 to 3% by weight, and ammonia in a quantity of from 0.05 to 3% by weight and preferably in a quantity of from 0.05 to 1.5% by weight, based in each case on the polymer. The polysiloxane and the ammonia may be added to the heat-sensitisable latices in admixture.

This mixture, of which 100 parts by weight consists of 1.5 to 99.5 parts by weight of polysiloxane and 98.5 to 0.5 part by weight of ammonia, is preferably added in the form of a 10 to 90% aqueous solution. The mixture is prepared while stirring, preferably at temperatures of from 5° to 50° C. To this end, the polysiloxane is initially introduced, followed by addition of the aqueous ammonia solution, or an aqueous solution is initially prepared by adding water to the polysiloxane or by dissolving the polysiloxane in water, after which an aqueous ammonia solution is added to or gaseous ammonia is introduced, into the aqueous solution thus prepared. It is also possible initially to introduce the aqueous ammonia solution and then to add the polysiloxane in 100% form or in aqueous solution.

The mixture of ammonia and polysiloxane may also be produced with advantage by separate addition to the heat-sensitisable rubber latices. In this case, the polysiloxane may be added in 100% form or in many cases with greater advantage in the form of an aqueous solution, whilst the ammonia may be added in the form of an aqueous, preferably 5 to 35% solution. In the case of separate addition, it is advantageous to add the ammonia before the heat sensitiser. It is also possible to add the ammonia completely or in part during the polymerisation reaction.

It has been found that the heat-sensitive latex mixtures containing the heat sensitisers according to the invention in conjunction with ammonia are particularly stable so that no coagulation occurs, even in the event of prolonged storage or under mechanical stressing, for example during stirring or pumping.

The heat-sensitised latex mixtures according to the invention may be used, for example, for binding non-woven materials consisting of synthetic or natural fibres. Examples of such non-woven materials are non-woven materials of cotton, synthetic wool, wool, polyamides, polyesters, polyacrylonitrile, glass fibres, mineral wool, asbestos wool or metal filaments.

EXAMPLE 1

105 g of a polyepoxy polysiloxane corresponding to the formula

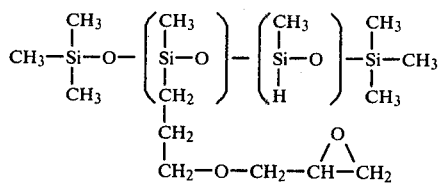

and having a

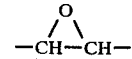

epoxide content of 19.9% by weight and an Si—H-content of 2.33% by weight are added dropwise to a mixture of 1460 g of a polyalkylene glycol monoether having an OH-number of 25, produced by alkoxylating butanol with equal parts by weight of ethylene and propylene oxide, 80% of the ethylene oxide initially being reacted with the entire quantity of propylene oxide in admixture and the remaining 20% of the ethylene oxide being subsequently reacted, and 2 g of boron trifluoride etherate. The mixture is then stirred for 3 hours at room temperature and for 1 hour at 60° C. A colourless oil forming a clear solution in cold water is obtained.

EXAMPLE 2

Following the procedure of Example 1, 1460 g of the polyalkylene glycol monoether described in Example 1 are reacted with 100.5 g of a polyepoxy polysiloxane corresponding to the formula

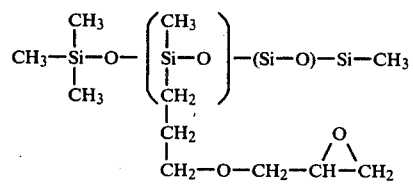

and having an epoxide content of 20.9% by weight, in the presence of 2 g of boron trifluoride etherate as catalyst. A colourless oil which forms a clear solution in cold water is obtained.

EXAMPLE 3

Following the procedure of Example 1, 1460 g of the polyalkylene glycol monoether described in Example 1 are reacted with 225.6 g of a polyepoxy polysiloxane corresponding to the formula

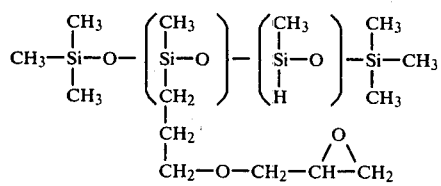

and having an epoxide content of 9.3% by weight, in the presence of 2 g of boron trifluoride etherate as catalyst. A colourless oil which forms a clear solution in cold water is obtained.

EXAMPLE 4

Following the procedure of Example 1, 1700 g of a polyalkylene glycol monoether having an OH-number of 22, produced by alkoxylating butanol with equal parts by weight of ethylene and propylene oxide, 80% of the ethylene oxide initially being reacted with the total quantity of propylene oxide in admixture and the remaining 20% of the ethylene oxide being subsequently reacted, are reacted with 105 g of the polyepoxy polysiloxane described in Example 1 in the presence of 2.5 g of boron trifluoride etherate as catalyst. A colourless oil which forms a clear solution in cold water is obtained.

EXAMPLE 5

Following the procedure of Example 1, 900 g of a polyalkylene glycol monoether having an OH-number of 40.5, produced by alkoxylating butanol with a mixture of 55% of ethylene oxide and 45% by weight of propylene oxide, 82% of the ethylene oxide initially being reacted with the entire quantity of propylene oxide in admixture and the remaining 18% of the ethylene oxide being subsequently reacted, are reacted with 105 g of the polyepoxy polysiloxane described in Example 1 in the presence of 1.33 g of boron trifluoride etherate as catalyst. A coluorless oil which forms a clear solution in cold water is obtained.

EXAMPLE 6

Following the procedure of Example 1, 1050 g of a polyalkylene glycol monoether having an OH-number of 35, produced by alkoxylating butanol with equal parts by weight of ethylene and propylene oxide, 80% of the ethylene oxide being initially reacted with the entire quantity of propylene oxide in admixture and the remaining 20% of the ethylene oxide being subsequently reacted, are reacted with 105 g of the polyepoxy polysiloxane described in Example 1 in the presence of 1.5 g of boron trifluoride etherate as catalyst. A colourless oil which forms a clear solution in cold water is obtained.

EXAMPLE 7

Following the procedure of Example 1, 1350 g of a polyalkylene glycol monoether having an OH-number of 27, produced by alkoxylating a mixture of equal parts by weight of ethylene and propylene oxide, are reacted with 105 g of the polyepoxy polysiloxane described in Example 1 in the presence of 2.0 g of boron trifluoride etherate as catalyst. A colourless oil which forms a clear solution in cold water is obtained.

EXAMPLE 8

A mixture of 1 litre of toluene and 1122 g of the polyalkylene glycol monoether described in Example 1 is freed from traces of moisture in a water separator. After the addition of 1 g of dibutyl tin dilaurate, 41.5 g allyl isocyanate are added dropwise over a period of 20 minutes at boiling temperature, followed by heating under reflux for another hour. The toluene is then distilled off, initially under normal pressure and then in a water jet vacuum of 15 mm Hg. The resulting allyl urethane of the polyalkylene glycol monoether is reacted with 41.6 g of an SiH-group-containing polysiloxane corresponding to the formula

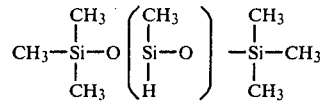

and having an Si-H-content of 34.9%, for 4 to 5 hours at 150° C. in the presence as catalyst of 10 g of $Al_2O_3$ on which 2% of platinum have been deposited. A yellow oil which forms a clear solution in cold water is obtained.

EXAMPLE 9

210.0 parts by weight of a 47.5% latex of the copolymer of 61.0% by weight of butadiene, 35.0% by weight of acrylonitrile and 4% by weight of methacrylic acid are mixed with 40.0 parts by weight of a vulcanisation paste of the following composition:
- 0.2 part by weight of colloidal sulphur
- 5.0 parts by weight of zinc oxide
- 1.5 parts by weight of 2-mercapto benzthiazole
- 0.2 part by weight of zinc diethyl dithiocarbamate
- 5.0 parts by weight of titanium dioxide
- 28.1 parts by weight of a 5% aqueous solution of a condensation product of naphthalene sulphonic acid with formaldehyde
- 0.2 part by weight of the compound of Example 1
- 70.0 part by weight of water and
- 1.0 part by weight of a 25% aqueous ammonia solution, and the coagulation point of the mixture is determined after 30 minutes and then after standing for seven days. In addition, the mechanical stability of the mixture is determined by a stirring test.

Method for determining the coagulation point

Approximately 10 g of the heat-sensitised mixture are weighed into a glass beaker which is then placed in a water-bath having a constant temperature of 80° C. The coagulation behaviour and increase in temperature of the mixture are observed while it is uniformly stirred with a thermometer. The coagulation point of the mixture is that temperature at which a complete and definitive separation of polymer and aqueous phase occurs.

Method for determining mechanical stability 500.0 g of the latex mixture to be tested, accommodated in a 13 cm diameter glass beaker, are subjected to mechanical stressing at a temperature of 20° C. by a high speed four-blade stirrer. The blades of the stirrer have a diameter of approximately 8 cm. The rotational speed of the stirrer is 1500 rpm. A sample of the latex mixture is taken every 5 minutes, coated onto a strip of dark paper and examined for coagulate formation. As soon as the first coagulate particles are observed, the time is clocked and the test terminated. The period of time elapsing before the first signs of coagulation appear is a measure of mechanical stability. The test is terminated after 60 minutes at the latest.

| Coagulation point: | after 30 minutes | 41° C. |
|---|---|---|
|  | After 7 days | 40° C. |
| Mechanical stability: | 20 to 25 minutes. |  |

Where 0.1 part by weight of the compound of Example 1 is used, the following results are obtained:

coagulation point after 30 minutes: 50° C.
coagulation point after 7 days: 50° C.
mechanical stability: 30 minutes.

Where 0.4 part by weight of the compound is used, the following results are obtained:
coagulation point after 30 minutes: 35° C.
coagulation point after 7 days: 34° C.
mechanical stability: 15 to 10 minutes.

EXAMPLES 10 TO 16

Following the procedure of Example 9, the compounds of Examples 2 to 7 are introduced into the mixture and the coagulation points and mechanical stabilities determined:

| Ex. No. | Compound of Ex. No. | Quantity used (g) | Coagulation point after 30 mins. °C. | Coagulation point after 7 days °C. | Mechanical Stability minutes |
|---|---|---|---|---|---|
| 10 | 2 | 0.2 | 40 | 40 | 20-25 |
| 11 | 3 | 1.0 | 45 | 47 | 20 |
| 12 | 4 | 0.2 | 45 | 46 | 25 |
| 13 | 5 | 0.2 | 50 | 50 | 30 |
| 14 | 6 | 0.2 | 44 | 44 | 25 |
| 15 | 7 | 0.2 | 43 | 42 | 20 |
| 16 | 8 | 0.2 | 47 | 52 | 15-20 |

EXAMPLE 17

40.0 parts by weight of the vulcanisation paste described in Example 9, 0.3 part by weight of the compound of Example 1, 80.0 parts by weight of water and 1.0 part by weight of a 25% aqueous ammonia solution are added to 200 g of a conventionally produced 50% aqueous dispersion of a copolymer of 62 parts of butadiene, 36 parts of acrylonitrile and 2 parts of methacrylic acid. Determination of the coagulation point and mechanical stability by the methods described in Example 9 produced the following results:

| coagulation point: | after 30 minutes | 42° C. |
|---|---|---|
|  | after 7 days | 42° C. |
| Mechanical stability: | 25 to 30 minutes. | |

EXAMPLE 18

The following constituents are combined to produce a latex mixture processible in heat-sensitised form: 225.0 parts by weight of a 45% latex of a copolymer of 60.0% by weight of butadiene, 26.0% by weight of styrene, 10.0% by weight of acrylonitrile, 3.0% by weight of methacrylic acid and 1.0% by weight of methacrylamide; 10.0 parts by weight of a 20% aqueous solution of an ethoxylated aliphatic alcohol; 10.0 parts by weight of a 10% aqueous ammonium chloride solution; 40.0 parts by weight of the vulcanisation paste described in Example 9; 0.8 parts by weight of the compound of Example 1; 72.0 parts by weight of water and 2.0 parts by weight of a 25% aqueous ammonium solution.

Measurement of the coagulation point of the latex mixture produced the following results:

| coagualtion point: | after 1 hour | 45° C. |
|---|---|---|
|  | after 7 days | 45° C. |
| Mechanical stability | 15 minutes. | |

EXAMPLE 19 (COMPARISON EXAMPLE)

A latex mixture is produced in accordance with Example 9. The organopolysiloxane A of Example 1 of DAS No. 1,494,037 is used as heat sensitiser.

| Sample | Quantity used g | Coagulation temperature after 30 minutes (°C.) | |
|---|---|---|---|
| a | 0.1 | 74 | The mixture is coagulated after 2 hours at room temperature |
| b | 0.2 | The mixture is coagulated after only 30 minutes | |

EXAMPLE 20 (COMPARISON EXAMPLE)

A latex mixture is produced in accordance with Example 9. In this case, however, 0.2 g of the siloxane oxyalkylene copolymer of Example 5 of U.S. Pat. No. 3,484,394 is used as the heat sensitizer.

Coagulation point: immediate/46° C.
Mechanical stability: 15 minutes.

If the mixture is produced in the absence of ammonia, coagulate formation is observed immediately after startup of the four-blade stirrer in the mechanical stability test.

EXAMPLE 21

300 g of water and then 1000 g of a 25% aqueous ammonia solution are added with stirring at room temperature to 200 g of the polysiloxane of Example 2. A clear, thinly liquid solution is obtained.

We claim:

1. A mixture consisting of ammonia and alkoxylated polysiloxanes corresponding to the formula

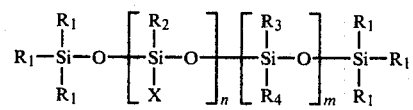

in which the formula represents the gross composition of a linear, statistically distributed copolymer of n parts of

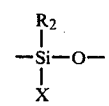

and m parts of

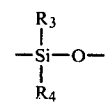

units with terminal

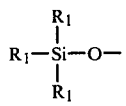

groups and in which $R_1$, $R_2$ and $R_3$ independently of one another represent an unsubstituted or halogen substituted $C_1-C_{10}$-alkyl or aryl, $R_4$ represents hydrogen or a $C_1-C_{10}$-alkyl or aryl unsubstituted or substituted by halogen, n is a number from 1 to 50, m is a number from 0 to 50, X represents

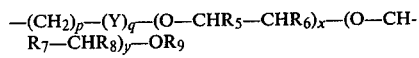

wherein p is a number from 1 to 8 and q is 0 or the number 1,

Y represents

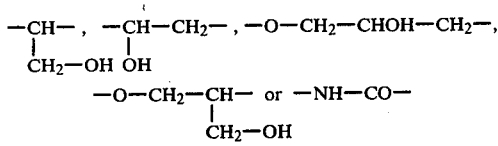

$R_5$, $R_6$, and $R_7$ are hydrogen, $R_8$ is methyl, $R_9$ represents an alkyl moiety of a lower alcohol and x and y are numbers from 5 to 100 characterized in that the

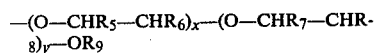

moiety of X is obtainable by reacting a lower alcohol of the formula $R_9$-OH first with a mixture of propylene oxide and 80–90% of the total amount of ethylene oxide and subsequently reacting the remaining 10–20% ethylene oxide.

2. The mixture according to claim 1 wherein $R_1$, $R_2$ and $R_3$ are methyl or phenyl;

$R_4$ is hydrogen or methyl;

n is a number from 3–20;

m is a number from 0–20;

y is

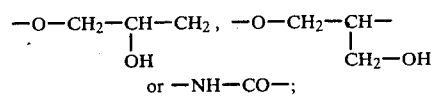

p is the number 1 or 3;

q is zero or one;

$R_9$ is an alkyl having 1–6 carbon atoms;

x is a number from 10–50; and y is a number from 8–40.

3. The mixture according to claim 1 wherein $R_1$, $R_2$, $R_3$ and $R_4$ are methyl;

n is a number from 4–10;

m is a number from 0–10;

p is 3;

q is 1;

x is a number from 15–35 and y is a number from 12–25.

4. The mixture according to claim 1 containing 1.5 to 99.5 parts by weight of polysiloxane and 98.5 to 0.5 parts by weight of ammonia.

5. A process for the production of heat-sensitized rubber latices, comprising mixing into a latex a heat-sensitizing amount of a mixture according to claim 1.

6. A latex composition heat sensitized by the mixture according to claim 1 wherein said latex contains 0.05–3% by weight ammonia and 0.05–10% by weight of said polysiloxane.

* * * * *